Patented Nov. 6, 1928.

1,690,900

UNITED STATES PATENT OFFICE.

KARL HOLZACH, OF LUDWIGSHAFEN-ON-THE-RHINE, AND RICHARD METZGER, OF HEIDELBERG, GERMANY, ASSIGNORS TO GRASSELLI DYESTUFF CORPORATION, OF NEW YORK, N. Y., A CORPORATION OF DELAWARE.

MANUFACTURE OF AZO DYESTUFFS.

No Drawing. Application filed January 3, 1927, Serial No. 158,819, and in Germany January 23, 1926.

We have found that valuable azo dyestuffs suitable for producing dyeings on cellulose acetate silk are obtained by coupling an unsulfonated hydroxy-quinoline or pyrazolone with a diazo compound of an aromatic amine containing one or more aldehyde groups in a free or combined state but no sulfonic acid groups. The dyestuffs obtained in this manner produce very fast dyeings which are particularly distinguished by their great fastness to light, on cellulose acetate silk. The dyestuffs may be prepared in substance and then applied to the fibre or they may be produced directly on the fibre in which case the dyestuff components may be applied to it in any desired order. The shade of the dyestuff may be varied to a considerable extent by converting the aldehyde group into a hydrazone or oxime or other derivative, and such conversion may be effected before or after coupling.

The following examples will further illustrate how our invention may be carried out in practice, but the invention is not limited to these examples. The parts are by weight.

Example 1.

121 parts of meta-amino-benzaldehyde are dissolved in 2000 parts of water and 300 parts of hydrochloric acid of 19° Baumé strength and diazotized in the usual manner. The diazo solution thus obtained is run into a solution of 165 parts of 1.3-dihydroxy-quinoline and 300 parts of sodium carbonate in 5000 parts of water. After some hours the formation of dyestuff is complete and the resulting product is made into a dyestuff paste in the usual manner. The dyestuff of the formula:

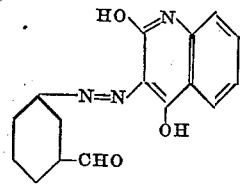

dyes cellulose acetate silk very pure yellow shades with a slight greenish hue which are very fast to light. By treating the dyeing with a 4 per cent solution of phenyl-hydrazine acetate, the shade is altered to violet brown.

Example 2.

A diazo solution is prepared as described in Example 1 and run into a solution of 180 parts of 3-methyl-1-phenyl-5-pyrazolone in 3500 parts of water to which 100 parts of caustic soda solution of 40° Baumé strength and 200 parts of sodium carbonate have been added. The resulting dyestuff of the formula:

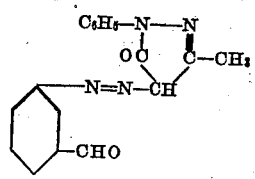

is made into a paste in the usual manner and dyes cellulose acetate silk very fast pure yellow shades.

We claim:

1. The process of producing azo dyestuffs suitable for dyeing cellulose acetate silk which consists in coupling an unsulfonated compound selected from the group consisting of hydroxy-quinolines pyrazolones with a diazo compound of an unsulfonated aromatic amine containing at least one aldehyde group.

2. As a new article of manufacture, azo dyestuffs suitable for dyeing cellulose acetate silk which are obtainable by coupling an unsulfonated compound selected from the group consisting of hydroxy-quinolines and pyrazolones with a diazo compound of an unsulfonated aromatic amine containing at least one aldehyde group, and are insoluble in water, In testimony whereof we have hereunto set our hands.

KARL HOLZACH.
RICHARD METZGER.